(12) United States Patent
Ward (10) Patent No.: US 10,532,412 B2
(45) Date of Patent: Jan. 14, 2020

(54) HOLE SAW ARBOR ASSEMBLY

(71) Applicant: MILWAUKEE ELECTRIC TOOL CORPORATION, Brookfield, WI (US)

(72) Inventor: Bryan C. Ward, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 15/712,268

(22) Filed: Sep. 22, 2017

(65) Prior Publication Data
US 2018/0085833 A1 Mar. 29, 2018

Related U.S. Application Data (60) Provisional application No. 62/398,619, filed on Sep. 23, 2016.

(51) Int. Cl.
*B23B 51/04* (2006.01)

(52) U.S. Cl.
CPC ...... *B23B 51/0473* (2013.01); *B23B 51/0426* (2013.01); *B23B 2231/0204* (2013.01); *B23B 2240/00* (2013.01); *B23B 2251/02* (2013.01); *B23B 2251/428* (2013.01);
(Continued)

(58) Field of Classification Search
CPC ..... B23B 51/04; B23B 51/0473; B23B 51/05; Y10T 408/95; Y10T 408/895; Y10T 408/8957
See application file for complete search history.

(56) References Cited

U.S. PATENT DOCUMENTS

| 2,879,036 A | 3/1959 | Wheeler |
| 3,049,033 A | 8/1962 | Benjamin et al. |
| 3,080,934 A | 3/1963 | Berscheid |

(Continued)

FOREIGN PATENT DOCUMENTS

| CN | 2865975 | 2/2007 |
| CN | 201394679 | 2/2010 |

(Continued)

OTHER PUBLICATIONS

European Patent Office Search Report for Application No. 17192777.5 dated Mar. 13, 2018, 7 pages.
(Continued)

*Primary Examiner* — Alan Snyder
*Assistant Examiner* — Yasir A Diab
(74) *Attorney, Agent, or Firm* — Michael Best & Friedrich LLP (57) ABSTRACT

A cutting tool includes a hole saw, a pilot bit, and an arbor assembly. The assembly includes a shank having a first end and a second end. The first end of the shank is removably coupled to the hole saw and to the pilot bit, and the second end of the shank is configured to be coupled to a power tool. The assembly also includes a sleeve moveable along the shank and a first ball bearing disposed on the sleeve. The first ball bearing engages the hole saw to releasably secure the hole saw to the shank. The assembly includes a second ball bearing disposed on the shank. The second ball bearing engages the pilot bit to releasably secure the pilot bit to the shank. When the sleeve moves toward the second end of the shank, the first and second ball bearings disengage the hole saw and the pilot bit.

20 Claims, 10 Drawing Sheets

(52) U.S. Cl.
CPC ... *B23B 2251/606* (2013.01); *B23B 2260/022* (2013.01); *Y10T 408/8957* (2015.01); *Y10T 408/95* (2015.01)

(56) References Cited

U.S. PATENT DOCUMENTS

| | | | |
|---|---|---|---|
| 4,527,638 A | 7/1985 | Sanchez et al. | |
| 4,728,231 A | 3/1988 | Kunimori et al. | |
| 4,744,704 A | 5/1988 | Galvefors | |
| 4,802,799 A | 2/1989 | Rachev | |
| 4,984,944 A | 1/1991 | Pennington, Jr. et al. | |
| 5,092,716 A | 3/1992 | Omi | |
| 5,338,135 A | 8/1994 | Noguchi et al. | |
| 5,451,128 A | 9/1995 | Hattersley | |
| 5,452,971 A | 9/1995 | Nevills | |
| 5,492,187 A | 2/1996 | Neukirchen et al. | |
| 5,597,274 A | 1/1997 | Behner | |
| 5,599,145 A | 2/1997 | Reinauer et al. | |
| 5,651,646 A | 7/1997 | Banke et al. | |
| 5,743,162 A | 4/1998 | Sundström | |
| 5,758,561 A | 6/1998 | Curtsinger et al. | |
| 5,794,503 A | 8/1998 | Asada | |
| 5,803,677 A | 9/1998 | Brutscher et al. | |
| 5,813,802 A | 9/1998 | Ajimi et al. | |
| 5,896,800 A | 4/1999 | Curtsinger et al. | |
| 5,904,455 A | 5/1999 | Krenzer et al. | |
| 5,931,614 A | 8/1999 | Meyen et al. | |
| 5,988,953 A | 11/1999 | Berglund et al. | |
| 6,007,279 A | 12/1999 | Malone, Jr. | |
| 6,021,857 A | 2/2000 | Birk et al. | |
| 6,065,370 A | 5/2000 | Curtsinger et al. | |
| D438,219 S | 2/2001 | Brutscher | |
| 6,205,902 B1 | 3/2001 | Vuorinen | |
| 6,299,389 B1 | 10/2001 | Barazani | |
| 6,551,036 B2 | 4/2003 | Heule | |
| 6,623,220 B2* | 9/2003 | Nuss | B23B 31/1071 279/75 |
| 6,702,047 B2 | 3/2004 | Huber | |
| 6,705,807 B1 | 3/2004 | Rudolph et al. | |
| 6,786,684 B1 | 9/2004 | Ecker | |
| 6,959,775 B2 | 11/2005 | Pedersen | |
| 6,981,911 B2 | 1/2006 | Martina | |
| 7,018,145 B2 | 3/2006 | Mast et al. | |
| 7,189,036 B1 | 3/2007 | Watson | |
| 7,241,089 B2 | 7/2007 | Mast et al. | |
| 7,258,180 B2 | 8/2007 | Kersten | |
| RE40,297 E | 5/2008 | Berglund et al. | |
| 7,401,667 B2 | 7/2008 | Duscha et al. | |
| 7,892,235 B2 | 2/2011 | Ellis | |
| 7,997,836 B2 | 8/2011 | Kim et al. | |
| 8,092,126 B2 | 1/2012 | Tanaka | |
| 8,123,443 B2 | 2/2012 | Khangar et al. | |
| 8,157,028 B2 | 4/2012 | Kersten | |
| 8,162,945 B2 | 4/2012 | Ellis | |
| 8,172,845 B2 | 5/2012 | Ellis | |
| 8,286,736 B2 | 10/2012 | Weaver et al. | |
| 8,444,353 B2 | 5/2013 | Khangar et al. | |
| 8,475,459 B2 | 7/2013 | Ellis | |
| D687,472 S | 8/2013 | Novak et al. | |
| 8,550,756 B2 | 10/2013 | Borschert et al. | |
| 8,573,907 B2 | 11/2013 | Kalomeris et al. | |
| 8,579,554 B2 | 11/2013 | Novak et al. | |
| 8,579,555 B2 | 11/2013 | Novak et al. | |
| 8,721,236 B2 | 5/2014 | Kazda et al. | |
| 2002/0050196 A1 | 5/2002 | Fluhrer et al. | |
| 2002/0081165 A1 | 6/2002 | Hecht | |
| 2002/0137433 A1 | 9/2002 | Lee et al. | |
| 2003/0141115 A1 | 7/2003 | Britten et al. | |
| 2004/0050234 A1 | 3/2004 | Fluhrer et al. | |
| 2004/0065183 A1 | 4/2004 | Asada | |
| 2005/0188792 A1 | 9/2005 | Asada | |
| 2006/0112799 A1 | 6/2006 | Hambleton et al. | |
| 2007/0160435 A1 | 7/2007 | Chao | |
| 2007/0212179 A1 | 9/2007 | Khangar et al. | |
| 2008/0264231 A1 | 10/2008 | Coe et al. | |
| 2008/0298922 A1 | 12/2008 | Oettle | |
| 2009/0000454 A1 | 1/2009 | Baernthaler et al. | |
| 2009/0044674 A1 | 2/2009 | Neitzell | |
| 2009/0126712 A1 | 5/2009 | Kullmann et al. | |
| 2009/0279972 A1* | 11/2009 | Novak | B23B 51/0473 408/239 R |
| 2010/0054885 A1* | 3/2010 | Goetz | B23B 31/1071 408/239 A |
| 2010/0126326 A1 | 5/2010 | Cloutier | |
| 2011/0197736 A1 | 8/2011 | Lizzi et al. | |
| 2011/0217133 A1 | 9/2011 | Ibarra et al. | |
| 2013/0296866 A1 | 11/2013 | Ellis | |
| 2014/0013916 A1 | 1/2014 | Athad | |
| 2014/0023447 A1 | 1/2014 | Thom et al. | |
| 2014/0255117 A1* | 9/2014 | Tseng | B23B 51/0473 408/204 |
| 2015/0000497 A1 | 1/2015 | Engvall et al. | |
| 2015/0239052 A1 | 8/2015 | Trumble et al. | |
| 2016/0059329 A1 | 3/2016 | Fendeleur et al. | |
| 2016/0166260 A1 | 6/2016 | Ellis | |
| 2016/0175945 A1 | 6/2016 | Chang | |
| 2016/0175947 A1 | 6/2016 | Chang | |
| 2017/0120347 A1 | 5/2017 | Lourenco et al. | |
| 2018/0193926 A1 | 7/2018 | Sawa et al. | |

FOREIGN PATENT DOCUMENTS

| | | |
|---|---|---|
| CN | 201597079 | 10/2010 |
| CN | 102689051 | 9/2012 |
| CN | 202963637 | 6/2013 |
| CN | 204171467 | 2/2015 |
| CN | 204321316 | 5/2015 |
| CN | 204565301 | 8/2015 |
| CN | 204818283 | 12/2015 |
| CN | 204997156 | 1/2016 |
| CN | 205519922 | 8/2016 |
| DE | 2422452 | 11/1975 |
| DE | 19623081 | 1/1998 |
| DE | 19810713 | 9/1999 |
| DE | 19910219 | 9/1999 |
| DE | 19913727 | 10/1999 |
| DE | 19939323 | 3/2000 |
| DE | 10042402 | 5/2001 |
| DE | 20101718 | 5/2001 |
| DE | 20113578 | 10/2001 |
| DE | 10253247 | 1/2004 |
| DE | 202005012328 | 10/2005 |
| DE | 202006010180 | 11/2006 |
| DE | 202006011952 | 11/2006 |
| EP | 118806 | 9/1984 |
| EP | 216064 | 4/1987 |
| EP | 352215 | 1/1990 |
| EP | 612575 | 8/1994 |
| EP | 715919 | 6/1996 |
| EP | 729801 | 9/1996 |
| EP | 1024247 | 8/2000 |
| EP | 1078706 | 2/2001 |
| EP | 1431511 | 6/2004 |
| EP | 1080859 | 3/2007 |
| EP | 1852202 | 11/2007 |
| EP | 1944107 | 7/2008 |
| EP | 1944108 | 7/2008 |
| EP | 2502693 | 9/2012 |
| EP | 2987577 | 2/2016 |
| FR | 2302808 | 10/1976 |
| FR | 2421022 | 10/1979 |
| GB | 191517961 | 12/1915 |
| GB | 550306 | 1/1943 |
| GB | 2201910 | 9/1988 |
| JP | H0966411 | 3/1973 |
| WO | 9706338 | 2/1997 |
| WO | 2007118518 | 10/2007 |
| WO | 2012159881 | 11/2012 |
| WO | 2012159947 | 11/2012 |
| WO | 2014180925 | 11/2014 |
| WO | 2016102261 | 6/2016 |
| WO | 2016102539 | 6/2016 |

(56) References Cited

FOREIGN PATENT DOCUMENTS

OTHER PUBLICATIONS

European Patent Office Search Report for Application No. 18150515.7 dated Jun. 20, 2018, 18 pages.
Co-pending U.S. Appl. No. 29/613,977, filed Aug. 15, 2017.

* cited by examiner

HOLE SAW ARBOR ASSEMBLY

CROSS-REFERENCE TO RELATED APPLICATIONS

This application claims priority to U.S. Provisional Patent Application No. 62/398,619, filed Sep. 23, 2016, the entire contents of which are incorporated by reference herein.

BACKGROUND

The present invention relates to arbor assemblies and, more particularly, to quick-release arbor assemblies for hole saws.

Typically, a hole saw is coupled to a rotating power tool using an arbor. An aperture defined by the hole saw is configured to receive a portion of the arbor. Furthermore, the aperture corresponds to threads on the portion of the arbor such that the hole saw is rotatably coupled to threads of the portion of the arbor. Quick removal of the hole saw from the arbor is typically desired.

SUMMARY

In one embodiment, the invention provides a cutting tool including a hole saw, a pilot bit, and an arbor assembly. The arbor assembly includes a shank having a first end and a second end and defining a longitudinal axis extending through the first and second ends. The first end of the shank is removably coupled to the hole saw and to the pilot bit, and the second end of the shank is configured to be coupled to a power tool. The arbor assembly also includes a sleeve moveable along the shank in a direction parallel to the longitudinal axis, and a first ball bearing disposed on the sleeve and moveable with the sleeve. The first ball bearing engages the hole saw to releasably secure the hole saw to the shank. The arbor assembly further includes a second ball bearing disposed on the shank and moveable relative to the sleeve. The second ball bearing engages the pilot bit to releasably secure the pilot bit to the shank. When the sleeve moves toward the second end of the shank, the first ball bearing disengages the hole saw and the second ball bearing disengages the pilot bit, allowing removal of the hole saw and the pilot bit from the shank.

In another embodiment, the invention provides a cutting tool including a hole saw and an arbor assembly. The arbor assembly includes a shank having a first end and a second end and defining a longitudinal axis extending through the first and second ends. The first end of the shank is removably coupled to the hole saw, and the second end of the shank is configured to be coupled to a power tool. The arbor assembly also includes a sleeve moveable along the shank in a direction parallel to the longitudinal axis, and a ball bearing disposed on the sleeve and moveable with the sleeve. The ball bearing engages the hole saw to releasably secure the hole saw to the shank. When the sleeve moves toward the second end of the shank, the ball bearing moves radially inward and disengages the hole saw, allowing removal of the hole saw from the shank.

In another embodiment, the invention provides an arbor assembly for use with a hole saw and a pilot bit. The arbor assembly includes a shank having a first end and a second end and defining a longitudinal axis extending through the first and second ends. The first end of the shank is configured to be coupled to the hole saw and to the pilot bit, and the second end of the shank is configured to be coupled to a power tool. The arbor assembly also includes a sleeve moveable along the shank in a direction parallel to the longitudinal axis, a spring biasing the sleeve toward the first end, and a first ball bearing disposed on the sleeve and moveable with the sleeve. The first ball bearing is configured to engage the hole saw to releasably secure the hole saw to the shank. The arbor assembly further includes a second ball bearing disposed on the shank and moveable relative to the sleeve. The second ball bearing is configured to engage the pilot bit to releasably secure the pilot bit to the shank. When the sleeve moves toward the second end of the shank, the first ball bearing is configured to disengage the hole saw and the second ball bearing is configured to disengage the pilot bit, allowing removal of the hole saw and the pilot bit from the shank.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figures 1, 2:
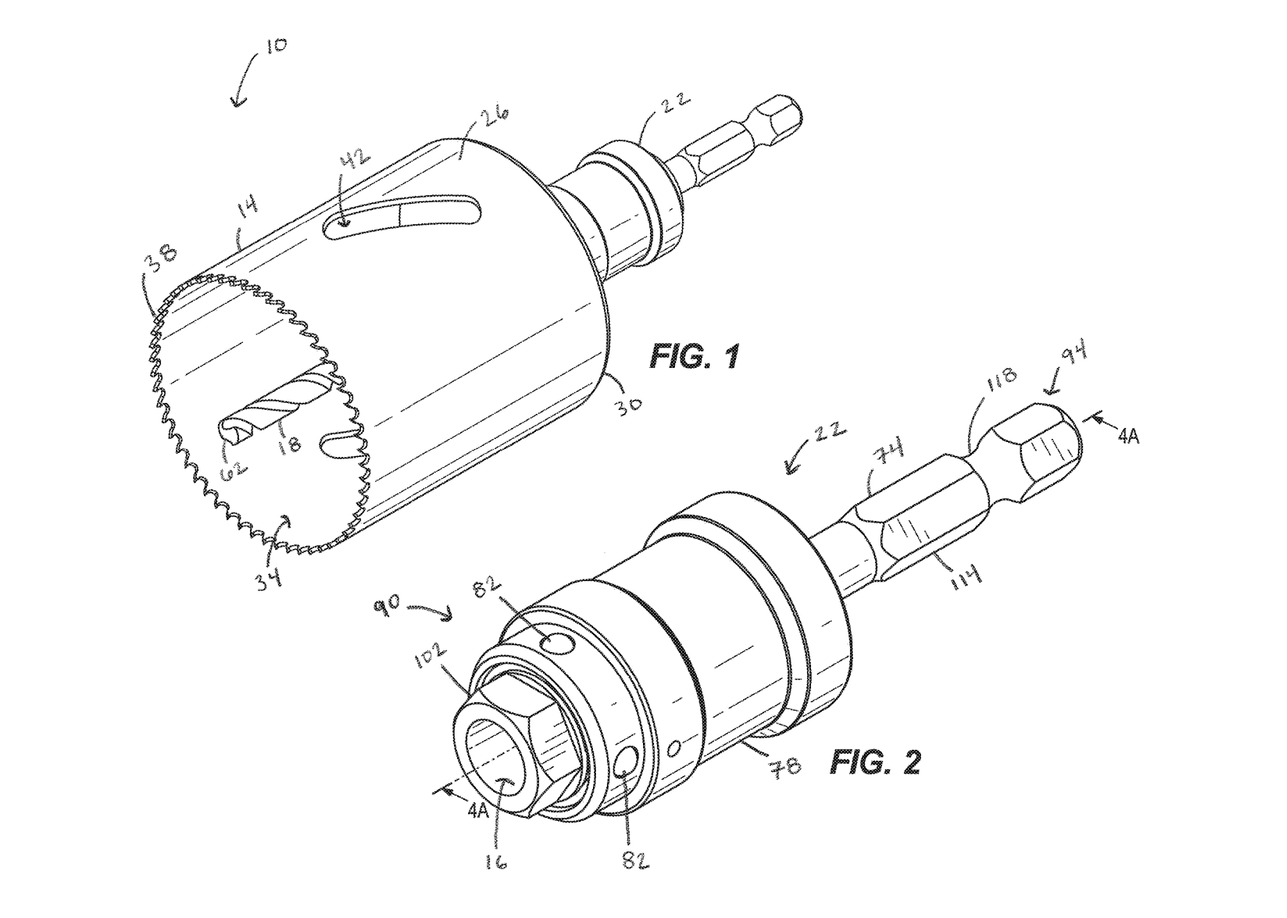
FIG. 1 is a perspective view of a hole saw and an arbor assembly embodying the invention.
FIG. 2 is a perspective view of the arbor assembly of FIG. 1.

FIG. 1 illustrates a cutting tool 10 including a hole saw 14, a pilot bit 18, and an arbor assembly 22 for a hole saw 14. The arbor assembly 22 includes a release mechanism for releasably coupling both the hole saw 14 and the pilot bit 18 to the arbor assembly 22. Thus, the arbor assembly 22 allows different types and/or sizes of hole saws and pilot bits to be interchangeably coupled to the arbor assembly 22 without the use of tools. Furthermore, if one part should fail first (e.g., the arbor assembly 22, the pilot bit 18, or the hole saw 14), a user can remove and replace that part instead of needing to throw away the entire cutting tool 10.

The hole saw 14 includes a generally cylindrical body 26 having a first or closed end 30 and a second or open end 34. The closed end 30 is configured to mount to the arbor assembly 22 for connecting the hole saw 14 to a power tool (e.g., a drill). The open end 34 includes a toothform 38 that is configured to cut through a work piece. In the illustrated embodiment, the toothform 38 is defined by a repeating pattern of cutting teeth and gullets. In other embodiments, the toothform 38 may have other configurations. At least one opening 42 is formed in the body 26 of the illustrated hole saw 14 between the closed and open ends 30, 34 to facilitate chip and plug removal form the hole saw 14.

Figure 4A:
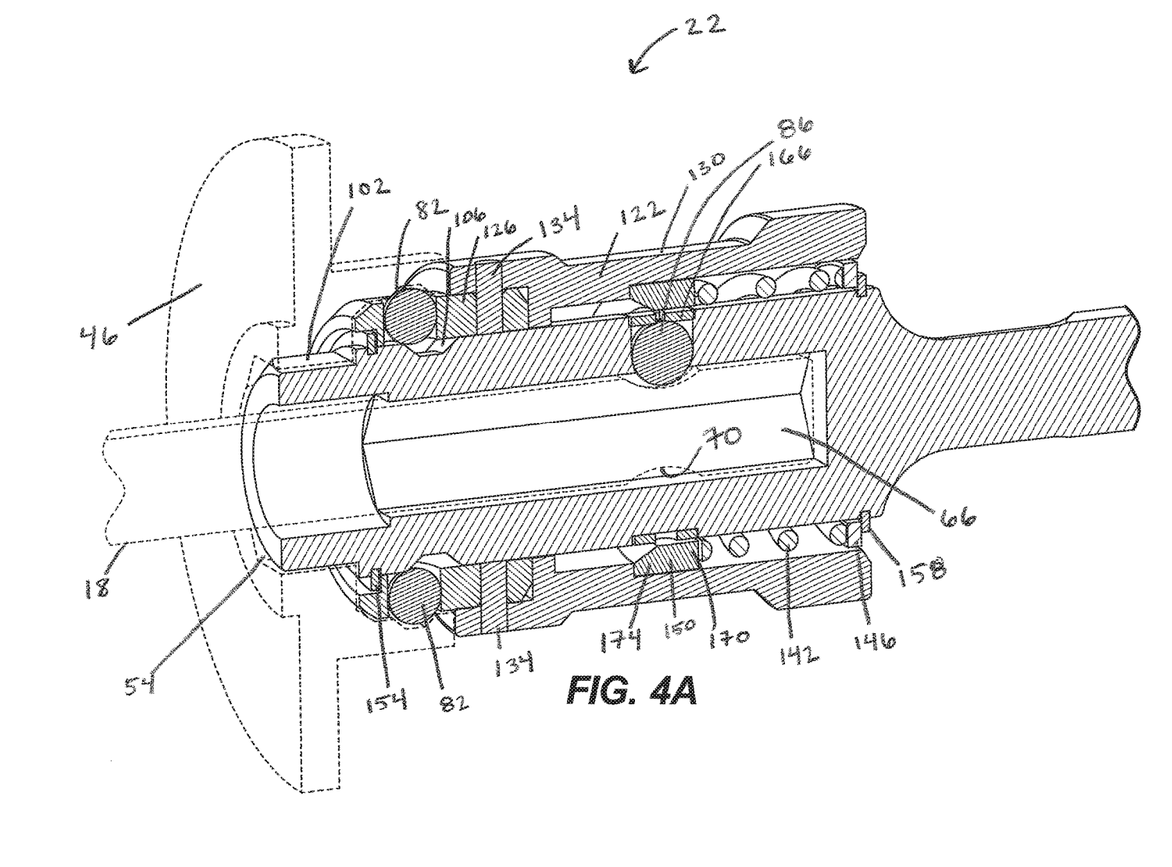
FIG. 4A is a cross-sectional view of the arbor assembly taken along section line 4A-4A of FIG. 2, the arbor assembly including a sleeve in a first position.
Figure 4B:
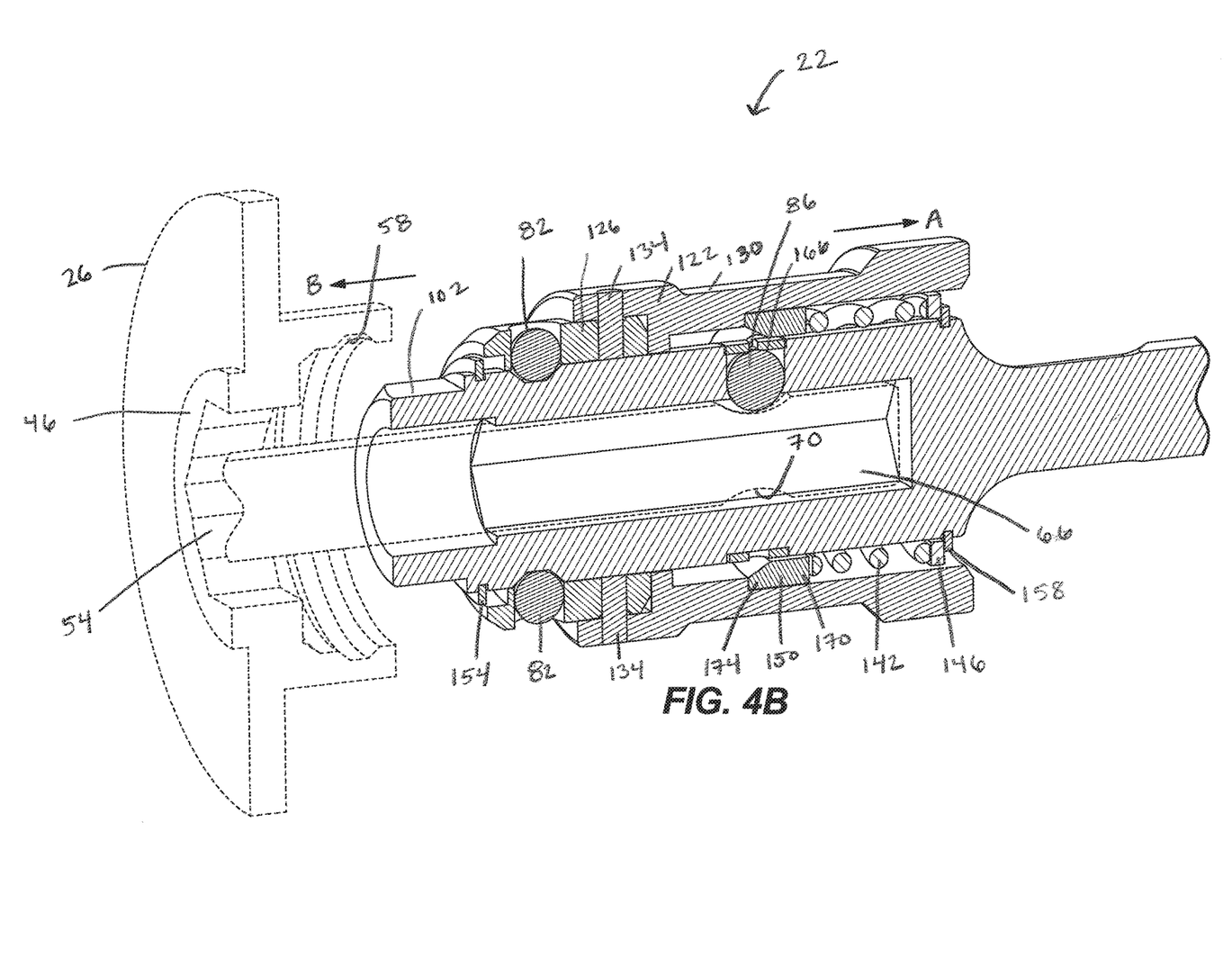
FIG. 4B is a cross-sectional view of the arbor assembly with the sleeve in a second position.
Figures 5, 6:
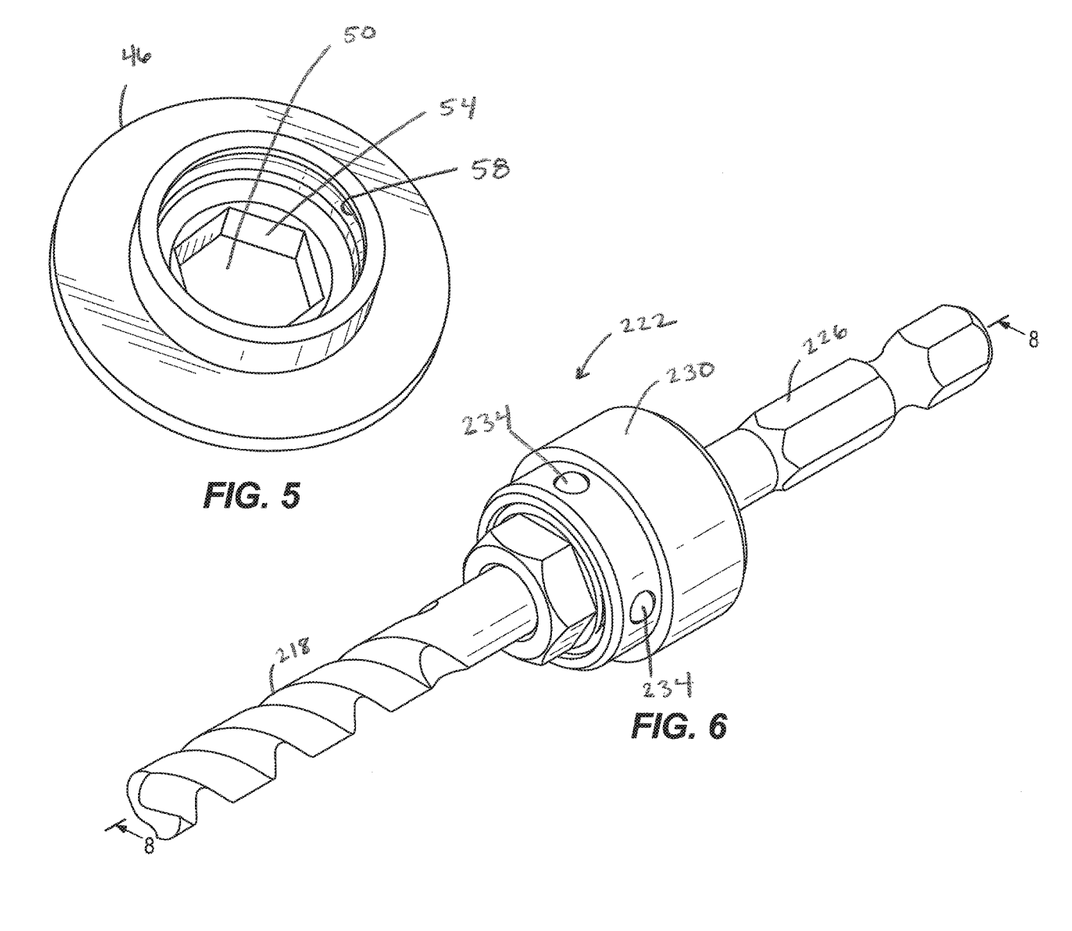
FIG. 5 is a perspective view of an end cap of the hole saw shown in FIG. 1.
FIG. 6 is a perspective view of another arbor assembly embodying the invention.
Figure 7:
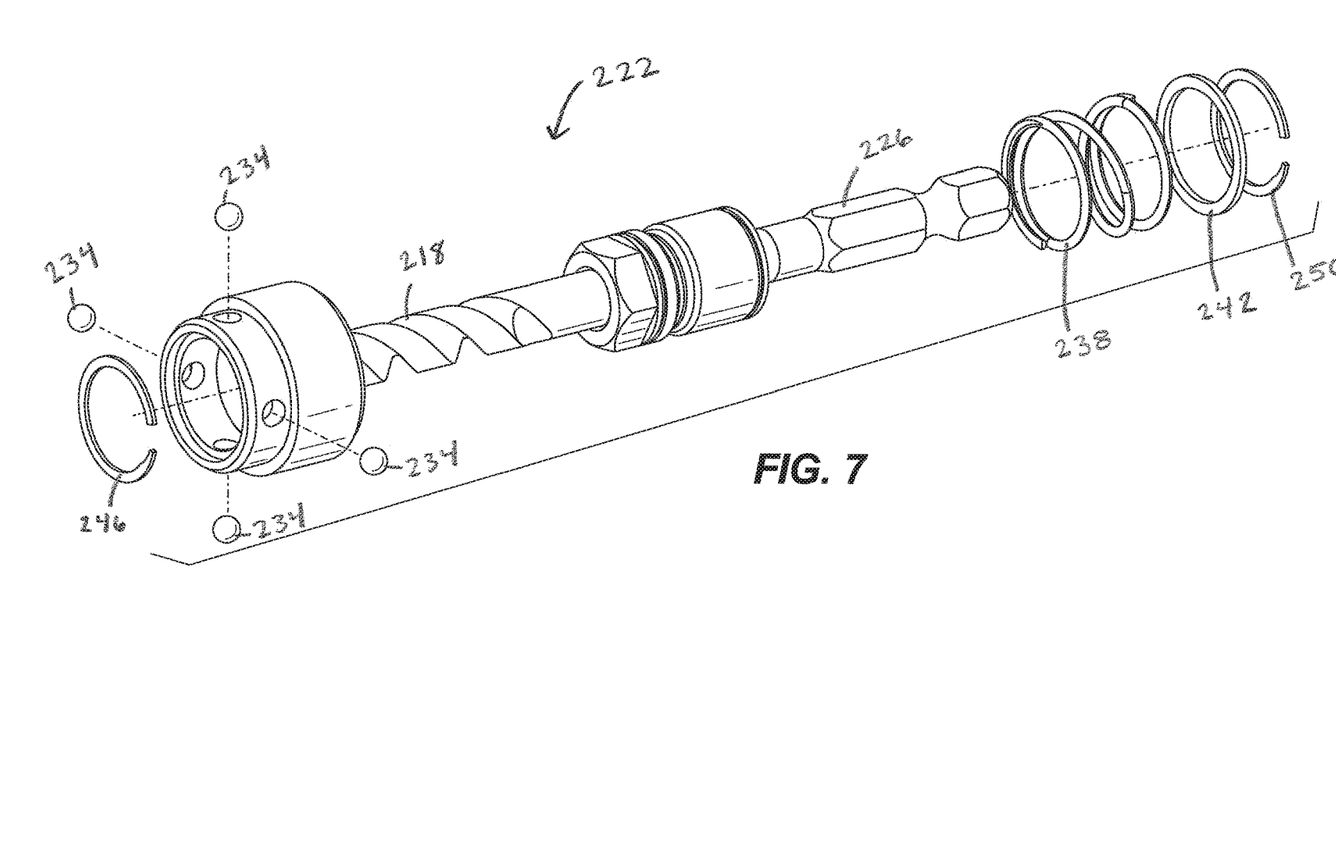
FIG. 7 is an exploded perspective view of the arbor assembly shown in FIG. 6.
Figure 8:
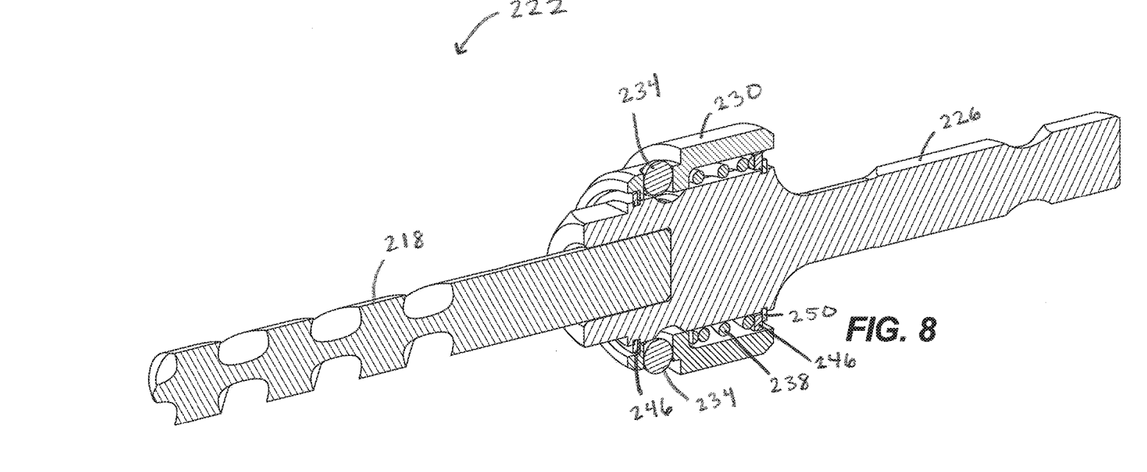
FIG. 8 is a cross-sectional view the arbor assembly taken along section line 8-8 of FIG. 6, the arbor assembly including a sleeve in a first position.
Figure 9:
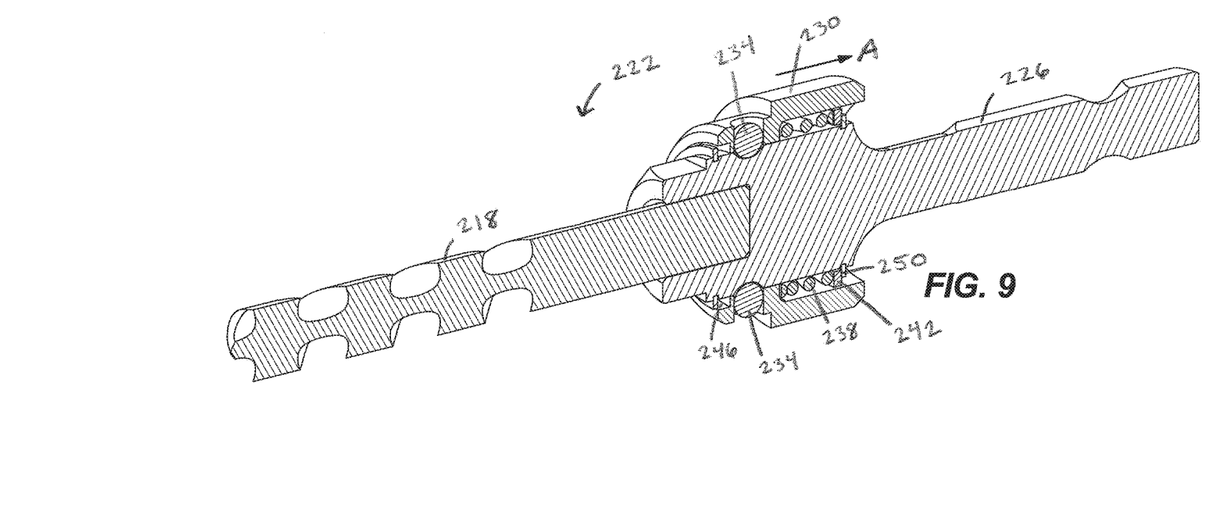
FIG. 9 is a cross-sectional view of the arbor assembly shown in FIG. 6 with the sleeve in a second position.
Figures 10, 11:
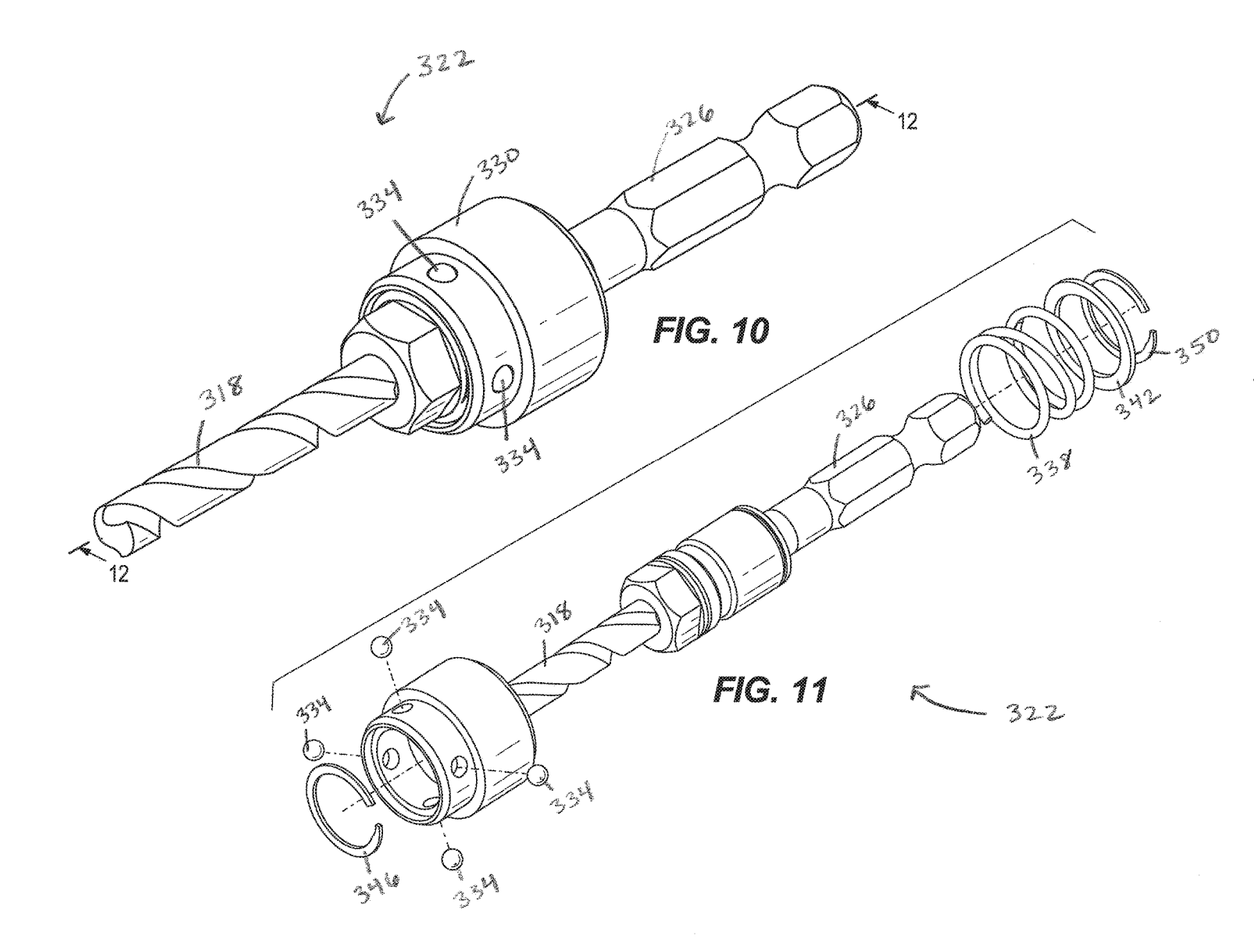
FIG. 10 is a perspective view of another arbor assembly embodying the invention.
FIG. 11 is an exploded perspective view of the arbor assembly shown in FIG. 10.
Figure 12:
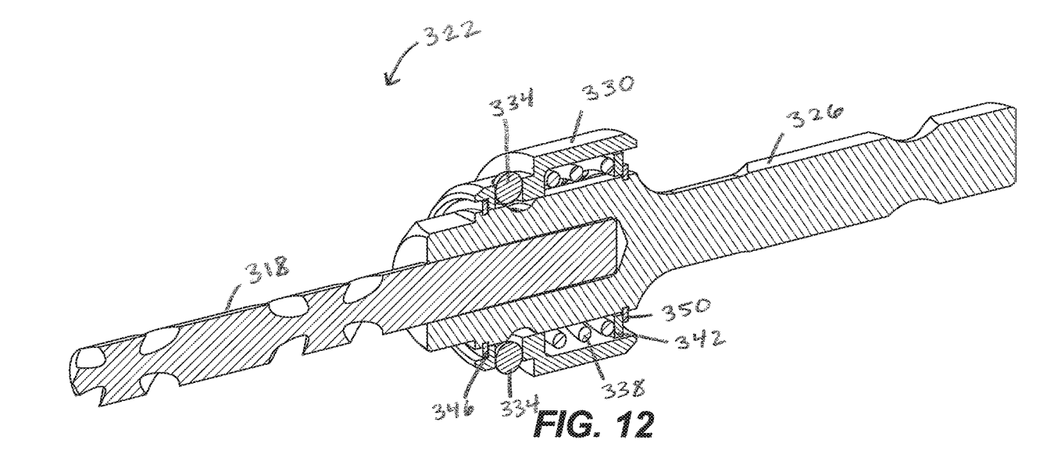
FIG. 12 is a cross-sectional view of the arbor assembly taken along section line 12-12 of FIG. 10, the arbor assembly including a sleeve in a first position.
Figure 13:
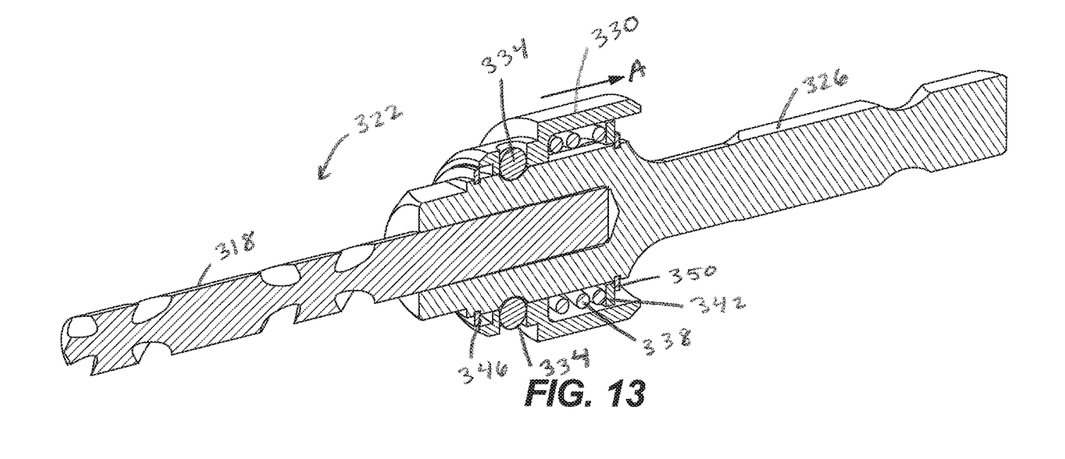
FIG. 13 is a cross-sectional view of the arbor assembly shown in FIG. 10 with the sleeve in a second position.

As shown in FIGS. 4A, 4B, and 5, the hole saw 14 further includes an end cap 46 coupled to the cylindrical body 26. The end cap 46 forms the closed end 30 of the body 26. The end cap 46 defines an opening 50 that receives a portion of the arbor assembly 22 to couple the hole saw 14 to the arbor assembly 14. In the illustrated embodiment, the opening 50 includes a hex-shaped section 54, rather than a threaded section. The hex-shaped section 54 allows the hole saw 14 to slide linearly on to and off of the arbor assembly 22 without rotating the hole saw 14. The opening 50 also includes a channel 58 adjacent the hex-shaped section 54. The channel 58 selectively receives part of the arbor assembly 22 to releasably secure the hole saw 14 to the arbor assembly 22. In the illustrated embodiment, the channel 58 is defined by a continuous annular groove formed on an inner surface of the end cap 46.

Referring to FIGS. 1 and 4A-4C, the pilot bit 18 is coupled to the arbor assembly 22 and surrounded by the hole saw 14. The pilot bit 18 includes a cutting portion 62 and a shaft 66. The cutting portion 62 extends beyond the open end 34 of the cylindrical body 26. The shaft 66 is generally hex-shaped. The shaft 66 is received by the arbor assembly 22 and defines an annular groove 70. The annular groove 70 selectively receives part of the arbor assembly 22 to releasably secure the pilot bit 18 to the arbor assembly 22. In the illustrated embodiment, the pilot bit 18 is a twist drill bit. In other embodiments, the pilot bit 18 may be other types of drill bits, such as a spade bit. The hole saw 14 and the pilot bit 18 are both removable from the arbor assembly 22 separately or simultaneously.

Figure 3:
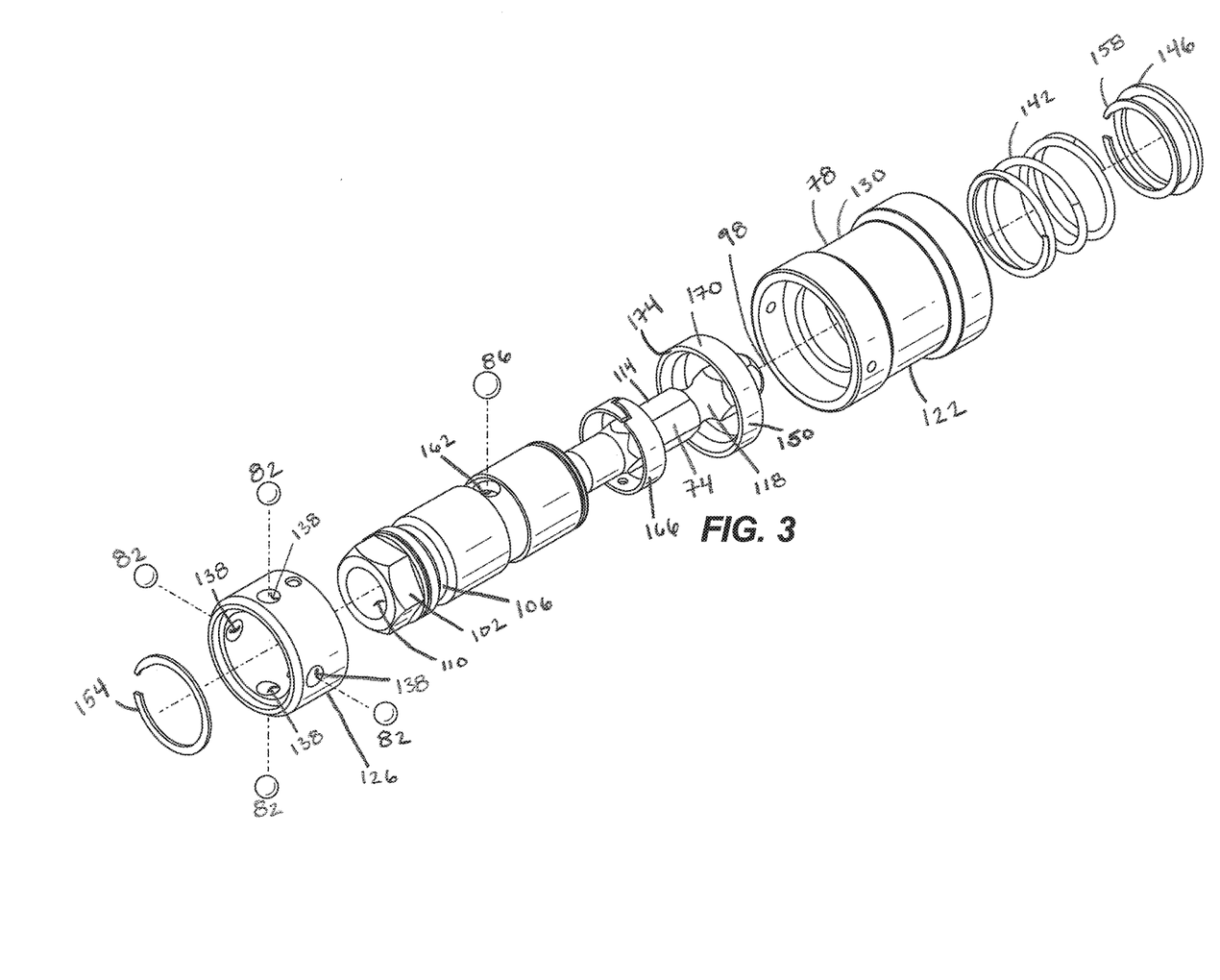
FIG. 3 is an exploded perspective view of the arbor assembly of FIG. 2.

As shown in FIGS. 2 and 3, the illustrated arbor assembly 22 includes a shank 74, a sleeve 78, first ball bearings 82, and a second ball bearing 86. The shank 74 forms the main body of the arbor assembly 22 and includes a first end 90 and a second end 94. The shank 74 also defines a longitudinal axis 98 extending through the first and second ends 90, 94. The first end 90 removably couples to the hole saw 14 and to the pilot bit 18. In particular, the illustrated first end 90 defines a hex-shaped boss 102, an annular recess 106, and an opening 110. The hex-shaped boss 102 is received in the hex-shaped section 54 (FIG. 5) of the end cap 46 to inhibit relative rotation between the hole saw 14 and the arbor assembly 22. The annular recess 106 is formed on an outer surface of the shank 74 adjacent the hex-shaped boss 102. The opening 110 is a bore formed through part of the shank 74. In the illustrated embodiment, the opening 110 is a hex-shaped opening that receives the shaft 66 of the pilot bit 18. The second end 94 of the shank 74 is configured to be coupled to the power tool. In the illustrated embodiment, the second end 94 includes a hex-shaped shaft 114 having an annular groove 118 that is configured to be received in and engaged by a chuck of the power tool. In other embodiments, the second end 94 may include other suitable shafts or coupling mechanisms for connecting to a power tool.

Figure 4C:
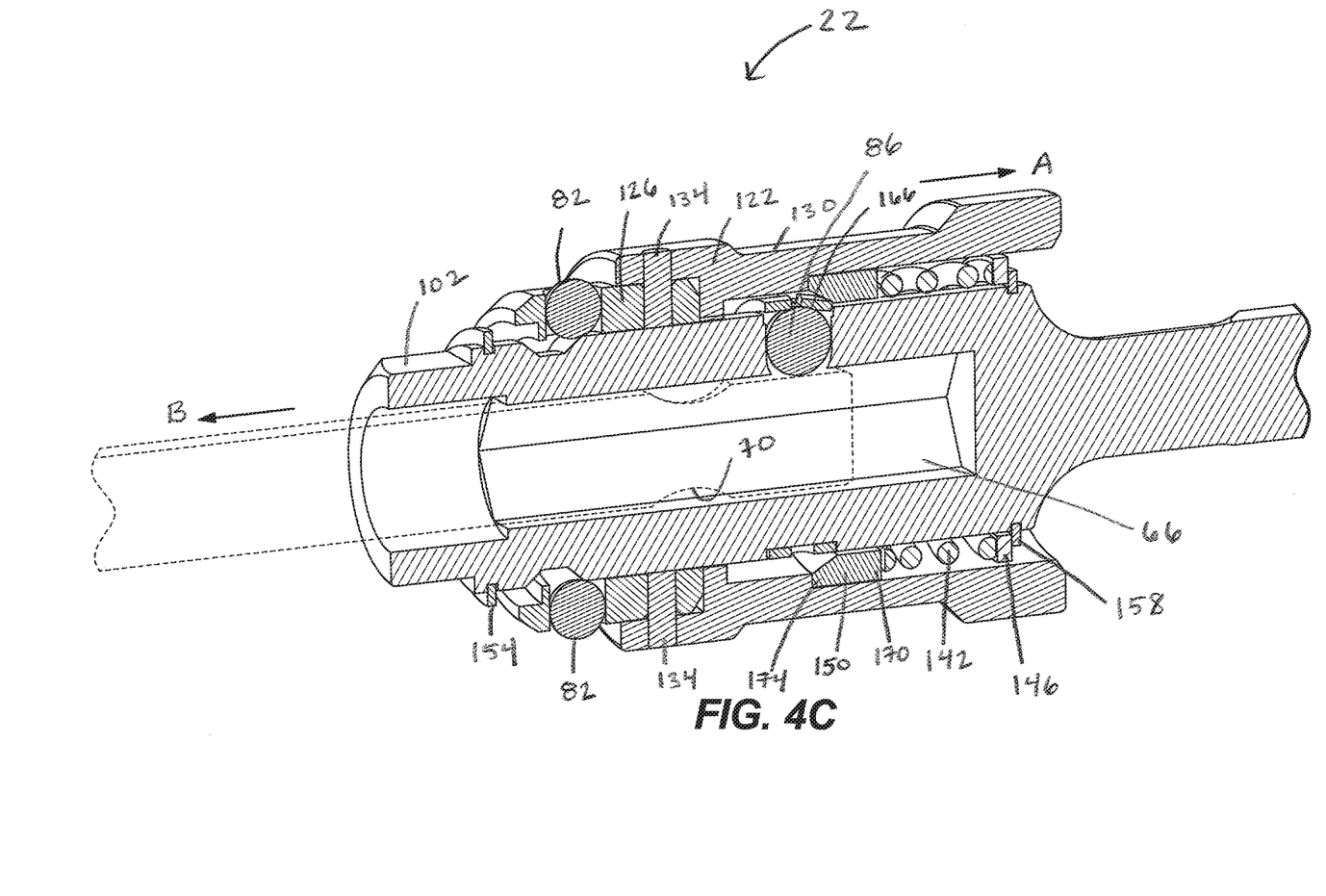
FIG. 4C is a cross-sectional view of the arbor assembly with the sleeve in a third position.

The sleeve 78 is supported by the shank 74 and is movable (e.g., slidable) along the shank 74 in a direction parallel to the longitudinal axis 98. In some embodiments, the sleeve 78 may also or alternatively rotate relative to the shank 74. The illustrated sleeve 78 includes a first body 122 and a second body 126. The first body 122 includes an outer grip surface 130 configured to be engaged by a user to move the sleeve 78 relative to the shank 74. The second body 126, or carrier, is coupled to and extends from the first body 122 adjacent the first end 90 of the shank 74. In the illustrated embodiment, the second body 126 is secured to the first body 122 with pins 134 (FIGS. 4A-4C). In other embodiments, the second body 126 may be integrally formed as a single piece with the first body 122. The second body 126 defines apertures 138 (FIG. 3) that receive the first ball bearings 82.

In the illustrated embodiment, the sleeve 78 is biased toward the first end 90 of the shank 74 by a spring 142. The spring 142 is positioned around a portion of the shank 74 within the sleeve 78. The illustrated spring 142 is a coil spring, although other suitable springs may also or alternatively be used. The spring 142 is captured between a stop ring 146 and a ramped ring 150 coupled to an inner surface of the sleeve 78. In addition, movement of the sleeve 78 along the shank 74 is limited by two snap rings 154, 158. As shown in FIG. 4A, the first snap ring 154 is coupled to the outer surface of the shank 74 between the hex-shaped boss 102 and the annular recess 106. The sleeve 78 contacts the first snap ring 154 when the sleeve 78 is biased toward the first end 90 of the shank 74 by the spring 142. The second snap ring 158 is coupled to the outer surface of the shank 74 adjacent the hex-shaped shaft 114. The stop ring 146, under the bias of the spring 142, maintains contact with the second snap ring 158.

Referring back to FIGS. 2 and 3, the first ball bearings 82 are disposed on the sleeve 78. More particularly, the first ball bearings 82 are supported in the apertures 138 of the second body 126. In the illustrated embodiment, the arbor assembly 22 includes four first ball bearings circumferentially spaced around the shank 74. In other embodiments, the arbor assembly 22 may include fewer or more first ball bearings 82. The first ball bearings 82 are movable with the sleeve 78 as the sleeve 78 moves (e.g., slides) along the shank 74. As shown in FIG. 4A, the first ball bearings 82 extend radially outward from the second body 126 when the sleeve 78 is in a first position to engage the hole saw 14. More particularly, the first ball bearings 82 extend into the channel 58 in the end cap 46 of the hole saw 14 to releasably secure the hole saw 14 to the arbor assembly 22. As shown in FIG. 4B, the first ball bearings 82 move radially inward when the sleeve 78 is in a second position to disengage the hole saw 14. More particularly, the first ball bearings 82 move into the annular recess 106 of the shank 74 to allow removal of the hole saw 14 from the arbor assembly 22.

Referring back to FIG. 3, the second ball bearing 86 is disposed on the shank 74. More particularly, the second ball bearing 86 is received in an aperture 162 formed in the shank 74. The aperture 162 communicates with the opening 110 of the shank 74. In the illustrated embodiment, the arbor assembly 22 includes a single second ball bearing 86. In other embodiments, the arbor assembly 22 may include more than one second ball bearing 86. As shown in FIGS. 4A and 4B, the second ball bearing 86 extends radially inward when the sleeve 78 is in the first and second positions to engage the pilot bit 18. More particularly, the second ball bearing 86 extends into the opening 110 and engages the annular groove 70 on the shaft 66 of the pilot bit 18 to releasably secure the pilot bit 18 to the arbor assembly 22. As shown in FIG. 4C, the second ball bearing 86 moves radially outward when the sleeve 78 is in a third position to disengage the pilot bit 18. More particularly, the second ball bearing 86 moves out of the annular groove 70 on the shaft 66 of the pilot bit 18 to allow removal of the pilot bit 18 from the arbor assembly 22.

In the illustrated embodiment, the second ball bearing 86 is biased radially inward (e.g., into engagement with the pilot bit 18) by a spring element 166. The illustrated spring element 166 is an annular spring member positioned within the sleeve 78 and surrounding a portion of the shank 74. In other embodiments, the second ball bearing 86 may be biased by other suitable spring elements (e.g., a coil compression spring). The ramped ring 150 engages the spring element 166 to help push the second ball bearing 86 radially inwardly. More particularly, when the sleeve 78 is in the first and second positions (FIGS. 4A and 4B), a relatively thick portion 170 of the ramped ring 150 engages the spring element 166, holding the spring element 166 and the second ball bearing 86 radially inward. When the sleeve 78 is in the third position (FIG. 4C), a tapered portion 174 of the ramped ring 150 is aligned with the spring element 166 so that the spring element 166 and the second ball bearing 86 can move radially outward and release the pilot bit 18.

FIGS. 4A-4C illustrate operation of the arbor assembly 22. As shown in FIG. 4A, the sleeve 78 is in the first position such that the hole saw 14 and the pilot bit 18 are secured to the arbor assembly 22. In this position, the sleeve 78 is moved (e.g., linearly slid) toward the first end 90 of the shank 74 under the bias of the spring 142. The first ball bearings 82, thereby, are moved out of the annular recess 106 of the shank 74 so that the first ball bearings 82 extend into and engage the channel 58 of the hole saw 14. Likewise, the second ball bearing 86 is pushed radially inward by the ramped ring 150 and the spring element 166 so that the second ball bearing 86 extends into and engages the annular groove 70 of the pilot bit 18. While in this position, the hole saw 14 and the pilot bit 18 cannot be readily pulled off of the arbor assembly 22.

As shown in FIG. 4B, the sleeve 78 is in the second position such that the hole saw 14 is removable from the arbor assembly 22 and the pilot bit 18 is secured to the arbor assembly 22. In this position, the sleeve 78 is moved in the direction of arrow A toward the second end 94 of the shank 74 against the bias of the spring 142. The first ball bearings 82, thereby, are moved into the annular recess 106 of the shank 74 so that the first ball bearings 82 disengage the channel 58 of the hole saw 14. In contrast, the second ball bearing 86 remains engaged with the annular groove 70 of the pilot bit 18. While in this position, the hole saw 14 can be removed from (e.g., pulled off of) the arbor assembly 22 in the direction of arrow B, but the pilot bit 18 remains secured to the arbor assembly 22. The hex-shaped section 54 of the hole saw 14 and hex-shaped boss 102 of the shank 74 allow the hole saw 14 to be pulled linearly off of the arbor assembly 22 without rotating the hole saw 14 relative to the arbor assembly 22.

As shown in FIG. 4C, the sleeve 78 is in the third position such that the pilot bit 18 is also removable from the arbor assembly 22. In this position, the sleeve 78 is moved further in the direction of arrow A toward the second end 94 of the shank 74 against the bias of the spring 142. The tapered portion 174 of the ramped ring 150 is aligned with the spring element 166 so that the second ball bearing 86 can move radially outward and disengage the pilot bit 18. While in this position, the pilot bit 18 can be removed from (e.g., pulled out of) the arbor assembly 22 in the direction of arrow B. As such, the sleeve 78 moves to different positions to separately allow removal of the hole saw 14 and the pilot bit 18 from the arbor assembly 22. In other embodiments, both release actions may occur simultaneously at one position of the sleeve 78.

Although the illustrated arbor assembly 22 is described as having the spring 142, which biases the sleeve 78 in one direction, in other embodiments the spring 142 may be omitted. For example, the sleeve 78 may be moved along the shank 74 only in response to actuation from a user. In such embodiments, the shank 74 and/or the sleeve 78 may include detent-type mechanisms to releasably hold the sleeve 78 in one or more of its positions. Additionally, in further embodiments, the sleeve 78 may rotate relative to the shank 74 to change positions. For example, the sleeve 78 may be threadably coupled to the shank 74 such that rotation of the sleeve 78 causes movement along the shank 74. Alternatively, the sleeve 78 may rotate about the shank 74 without changing axial positions, but such rotation may still cause movement of the ball bearings 82, 86 to engage and disengage the hole saw 14 and the pilot bit 18.

During use, interaction of hex-shaped profiles (e.g., the hex-shaped section 54 and the hex-shaped boss 102, and the hex-shaped opening 110 and the hex-shaped shaft 66) are used to drive rotation of the hole saw 14 and the pilot bit 18. The first ball bearings 86 inhibit relative axial movement between the hole saw 14 and the arbor assembly 22, but are not rotationally fixed relative to the hole saw 14, which may increase bearing life. In addition, by having the first ball bearings 86 face outwardly to engage the hole saw 14, the arbor assembly 22 can be smaller than previous arbors that have ball bearings extending inwardly. This is because in a previous arbor, there must be empty space in the middle of the arbor to allow for receipt of a portion of the hole saw that would extend into the arbor.

FIGS. 6-9 illustrate another arbor assembly 222 for a hole saw and a pilot bit 218. Although not shown in this embodiment, the hole saw may be similar to the hole saw 14 described above with reference to FIGS. 1-5. The illustrated arbor assembly 222 is similar to the arbor assembly 22 described above and includes like parts. Reference is hereby made to the description of the arbor assembly 22 shown in FIGS. 1-4C for description of features and elements of the arbor assembly 222 not specifically included below.

The illustrated arbor assembly 222 includes a shank 226, a sleeve 230, ball bearings 234, and a spring 238. The arbor assembly 222 also includes a stop ring 242 and two snap rings 246, 250. In the illustrated embodiment, the pilot bit 218 is not removable from the shank 226. As such, the arbor assembly 222 does not include a second (e.g., internal) ball bearing. When the sleeve 230 is slid in the direction of arrow A (FIG. 9), the ball bearings 234 only release the hole saw. The pilot bit 218 remains fixed (i.e., secured to) the arbor assembly 222.

FIGS. 10-13 illustrate yet another arbor assembly 322 for a hole saw and a pilot bit 318. Although not shown in this embodiment, the hole saw may be similar to the hole saw 14 described above with reference to FIGS. 1-5. The illustrated arbor assembly 322 is similar to the arbor assembly 22 described above and includes like parts. Reference is hereby made to the description of the arbor assembly 22 shown in FIGS. 1-4C for description of features and elements of the arbor assembly 322 not specifically included below.

The illustrated arbor assembly 322 includes a shank 326, a sleeve 330, ball bearings 334, and a spring 338. The arbor assembly 322 also includes a stop ring 342 and two snap rings 346, 350. In the illustrated embodiment, the pilot bit 318 is not removable from the shank 326. As such, the arbor assembly 322 does not include a second (e.g., internal) ball bearing. When the sleeve 330 is slid in the direction of arrow A (FIG. 13), the ball bearings 334 only release the hole saw. The pilot bit 318 remains fixed (i.e., secured to) the arbor assembly 322.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A cutting tool comprising:
   a hole saw;
   a pilot bit; and
   an arbor assembly including
      a shank having a first end and a second end and defining a longitudinal axis extending through the first and second ends, the first end of the shank removably coupled to the hole saw and to the pilot bit, the second end of the shank configured to be coupled to a power tool,
      a sleeve moveable along the shank in a direction parallel to the longitudinal axis,
      a first ball bearing disposed on the sleeve and moveable with the sleeve the first ball bearing engaging the hole saw to releasably secure the hole saw to the shank, and
      a second ball bearing disposed on the shank and moveable relative to the sleeve, the second ball bearing engaging the pilot bit to releasably secure the pilot bit to the shank,
   wherein the sleeve is moveable to a first position where the hole saw and the pilot bit are secured to the arbor assembly, to a second position where the first ball bearing disengages the hole saw, allowing removal of the hole saw from the shank, and to a third position where the second ball bearing disengages the pilot bit, allowing removal of the pilot bit from the shank.

2. The cutting tool of claim 1, wherein the shank defines a recess, and wherein the first ball bearing aligns with the recess when the sleeve moves toward the second end of the shank.

3. The cutting tool of claim 2, wherein the first ball bearing is moved radially outward to engage the hole saw when the sleeve moves toward the first end of the shank, and wherein the first ball bearing is moved radially inward to disengage the hole saw when the sleeve moves toward the second end of the shank.

4. The cutting tool of claim 3, wherein the hole saw includes an end cap defining a channel, wherein the channel receives the first ball bearing when the sleeve moves towards the first end of the shank.

5. The cutting tool of claim 1, wherein the shank defines an opening, wherein the opening receives a portion of the pilot bit, and wherein the second ball bearing extends into the opening and engages the portion of the pilot bit when the sleeve moves towards the first end of the shank.

6. The cutting tool of claim 5, wherein the second ball bearing is moved radially inward to engage the pilot bit when the sleeve moves toward the first end of the shank, and wherein the second ball bearing is moved radially outward to disengage the hole saw when the sleeve moves toward the second end of the shank.

7. The cutting tool of claim 5, wherein the opening is a hex-shaped opening, and wherein the pilot bit includes a hex-shaped shaft that is received in the hex-shaped opening.

8. The cutting tool of claim 5, wherein the arbor assembly further includes a spring element supported by the sleeve, and wherein the spring element aligns with and engages the second ball bearing when the sleeve moves towards the first end of the shank.

9. The cutting tool of claim 1, wherein the first ball bearing is part of a plurality of first ball bearings circumferentially spaced around the shank, and wherein the plurality of first ball bearings engages the hole saw to releasably secure the hole saw to the shank.

10. The cutting tool of claim 1, wherein the arbor assembly further includes a spring coupled to the sleeve, and wherein the spring biases the sleeve toward the first end of the shank.

11. The cutting tool of claim 10, wherein the spring includes a coil spring positioned around a portion of the shank.

12. The cutting tool of claim 11, wherein the spring is positioned within the sleeve.

13. A cutting tool comprising:
   a hole saw; and
   an arbor assembly including
      a shank having a first end and a second end and defining a longitudinal axis extending through the first and second ends, the first end of the shank removably coupled to the hole saw, the second end of the shank configured to be coupled to a power tool,
      a sleeve moveable along the shank in a direction parallel to the longitudinal axis and including an aperture, and
      a ball bearing supported in the aperture and axially moveable with the sleeve relative to the shank in the direction parallel to the longitudinal axis as the sleeve slides along the shank, the ball bearing engaging the hole saw to releasably secure the hole saw to the shank,
   wherein when the sleeve moves toward the second end of the shank, the ball bearing moves radially inward and disengages the hole saw, allowing removal of the hole saw from the shank.

14. The cutting tool of claim 13, wherein the shank defines a recess, and wherein the ball bearing aligns with the recess when the sleeve moves toward the second end of the shank.

15. The cutting tool of claim 14, wherein the ball bearing is moved radially outward to engage the hole saw when the sleeve moves toward the first end of the shank, and wherein the ball bearing is moved radially inward to disengage the hole saw when the sleeve moves toward the second end of the shank.

16. The cutting tool of claim 15, wherein the hole saw includes an end cap defining a channel, wherein the channel receives the ball bearing when the sleeve moves towards the first end of the shank.

17. The cutting tool of claim 13, wherein the ball bearing is part of a plurality of ball bearings circumferentially spaced around the shank, and wherein the plurality of ball bearings engages the hole saw to releasably secure the hole saw to the shank.

18. The cutting tool of claim 13, wherein the arbor assembly further includes a spring coupled to the sleeve, and wherein the spring biases the sleeve toward the first end of the shank.

19. The cutting tool of claim 18, wherein the spring includes a coil spring positioned around a portion of the shank within the sleeve.

20. An arbor assembly for use with a hole saw and a pilot bit, the arbor assembly comprising:
   a shank having a first end and a second end and defining a longitudinal axis extending through the first and second ends, the first end of the shank configured to be coupled to the hole saw and to the pilot bit, the second end of the shank configured to be coupled to a power tool;
   a sleeve moveable along the shank in a direction parallel to the longitudinal axis;
   a spring biasing the sleeve toward the first end;
   a first ball bearing disposed on the sleeve and moveable with the sleeve, the first ball bearing configured to extend radially outward and engage the hole saw to releasably secure the hole saw to the shank; and
   a second ball bearing disposed on the shank and moveable relative to the sleeve, the second ball bearing configured to extend radially inward and engage the pilot bit to releasably secure the pilot bit to the shank;
   wherein when the sleeve moves toward the second end of the shank, the first ball bearing is configured to axially move with the sleeve and to extend radially inward to disengage the hole saw and the second ball bearing is configured to extend radially outward to disengage the pilot bit, allowing removal of the hole saw and the pilot bit from the shank.

* * * * *